United States Patent [19]
Chu

[11] Patent Number: 5,284,991
[45] Date of Patent: Feb. 8, 1994

[54] CYANIDE REMOVAL FROM OILY SOLID USING A SOLVENT EXTRACTION PROCESS

[75] Inventor: Humbert H. Chu, Houston, Tex.

[73] Assignee: Shell Oil Company, Houston, Tex.

[21] Appl. No.: 946,685

[22] Filed: Sep. 18, 1992

[51] Int. Cl.$^5$ .................. C07C 7/00; B01D 37/00
[52] U.S. Cl. .................. 585/802; 585/867; 585/864; 585/833; 210/770; 210/772; 588/245; 208/13
[58] Field of Search .............. 585/802, 867, 864, 833; 210/770, 772; 588/245; 423/DIG. 20; 208/13

[56] References Cited

U.S. PATENT DOCUMENTS

| | | |
|---|---|---|
| 3,950,230 | 4/1976 | Greenfield et al. |
| 4,239,620 | 12/1980 | Doll et al. |
| 4,686,048 | 8/1987 | Atherton et al. |
| 4,741,840 | 5/1988 | Atherton et al. |
| 4,863,607 | 9/1989 | Andrew et al. |
| 4,906,302 | 3/1990 | Bruya |
| 4,975,198 | 12/1990 | Steiner |
| 4,981,579 | 1/1991 | Paspek et al. ............ 210/806 |
| 5,049,256 | 9/1991 | Luce |
| 5,160,636 | 11/1992 | Gilles et al. ............ 210/806 |

Primary Examiner—Anthony McFarlane
Assistant Examiner—Nhat D. Phan

[57] ABSTRACT

A process for the removal of cyanides from contaminated oily solid waste performed by utilizing a single processing zone wherein multiple processing steps are carried out to remove contaminants. The steps include loading a contaminated oily solid waste into a zone where the solid is reduced in size, adjusting the pH of the oily solid waste, dewatering or deoiling the oily solid waste and drying the resulting solid, extracting the resulting dried solid with organic solvent, and further drying the extracted solid to remove residual moisture, cyanide, solvent, and volatile organics.

11 Claims, 1 Drawing Sheet

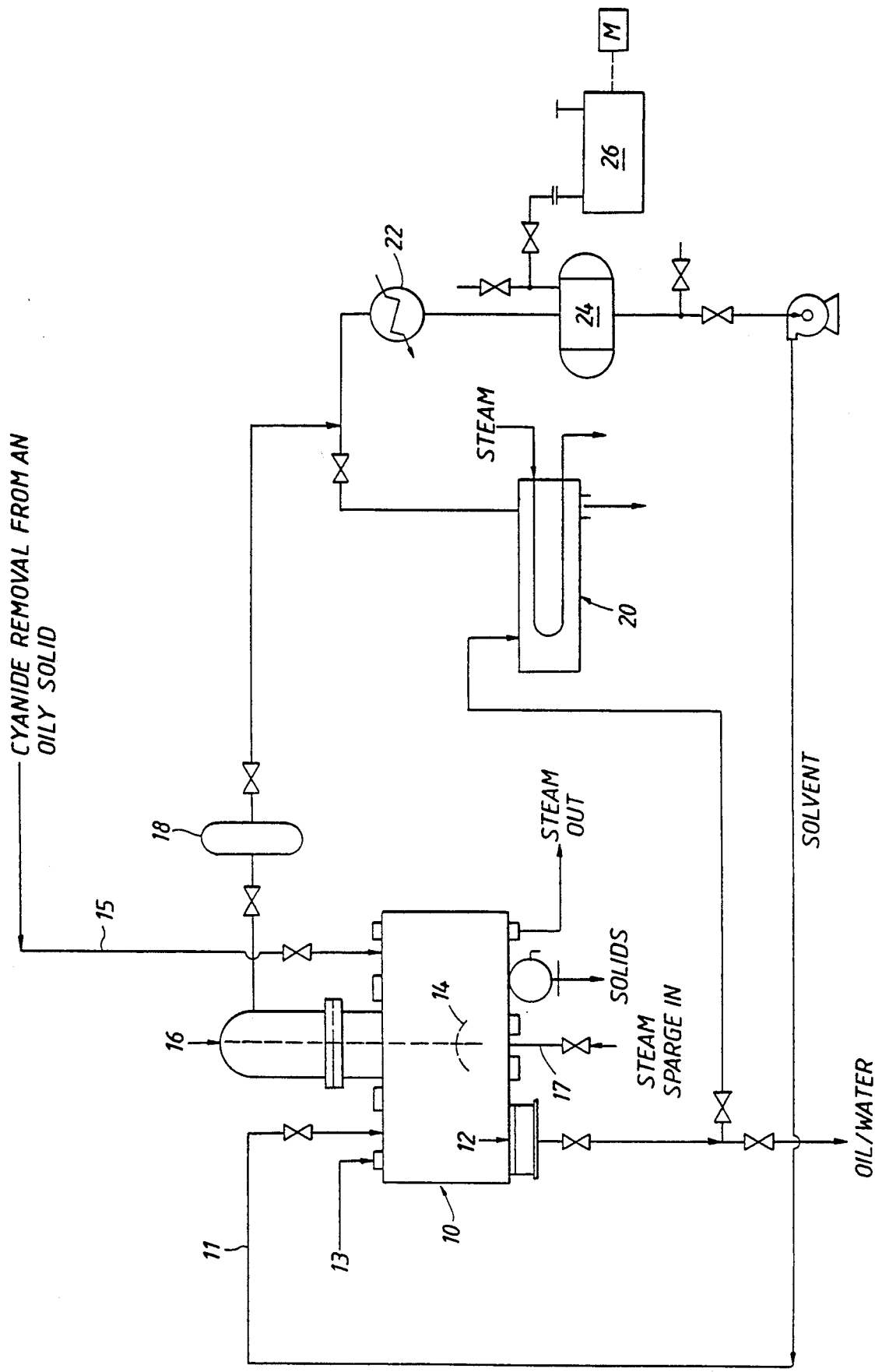

CYANIDE REMOVAL FROM OILY SOLID USING A SOLVENT EXTRACTION PROCESS

BACKGROUND OF THE INVENTION

1. Field of the Invention

The present invention pertains to a process for the removal of cyanides from a cyanide-contaminated oily solid.

2. Description of the Related Art

One of the basic problems of a solvent extraction process for the decontamination of oily solid wastes is the high cyanide content remaining on the solid following solvent extraction, which content exceeds Best Demonstrated Available Technology (BDAT) standards required by the EPA. Thermal desorption, the other leading alternative for on-site waste treatment, also cannot effectively eliminate cyanides.

U.S. Pat. No. 4,239,620 discloses cyanide removal from wastewaters. The method involves contacting an activated solid upstream of a wastewater treating plant with a concentrated cyanide bearing wastewater stream at a low pH within the range of 3-6. This process, however, fails to address removing cyanides from solids.

It would be highly desirable to remove cyanides from refinery oily solid to meet BDAT standards set by the EPA so that this solid can be sent to a Class 1 landfill, or to an on-site backfill.

SUMMARY OF THE INVENTION

The present invention proposes a solvent extraction process for an oily solid that includes a cyanide removal step. The proposed process comprises:

a) loading a cyanide-contaminated oily solid into a zone where the particle size of the solid is initially reduced in size;

b) adjusting the pH of the oily solid;

c) dewatering or deoiling the pH adjusted oily solid;

d) drying the resulting solid to remove moisture and volatile organics;

e) extracting at least once the resulting dried solid with an organic solvent boiling below about 150° C. to reduce the hydrocarbon contaminant level;

f) separating the solvent containing the extracted hydrocarbon contaminants from the extracted resulting dried solid by filtration and agitation; and g) further drying the extracted resulting dried solid to remove residual moisture, volatile organics, residual cyanides, and solvent.

BRIEF DESCRIPTION OF THE DRAWING

The FIGURE is a process flow diagram representing an oily solid decontamination process employing a single multipurpose processing unit.

DETAILED DESCRIPTION OF THE INVENTION

The present invention provides a solvent extraction process which is used to treat oily solid that contains a mixture of water, oil, solid and cyanides. The process removes water, cyanides, and oil, thus leaving nonhazardous solid residues acceptable for disposal in a Class 1 landfill or an onsite backfill.

One type of unit which is suitably used for decontaminating hydrocarbon-contaminated oily solid in the process of the invention is a single filter/dryer/mixer/extractor that is equipped to mix, extract, filter and dry the oily solid. For example, the multipurpose processing zone is suitably in the configuration of a steam-jacketed rotary drum, equipped with internal baffles for chopping and mixing, and suitable inlet means for introducing the solvent and the contaminated solid, as well as separate liquid and solid outlets with the liquid outlet located below the filtration device to facilitate solvent separation from its solvent-washed solid. A suitable multipurpose processing zone can be obtained by modification of a commercially available multipurpose processing zone such as the one used to extract caffeine from coffee beans that is manufactured by Littleford Brothers, Inc., Florence, Ky.

An illustrative suitable single processing zone will include a plow/chopper or equivalent device and a liquids-solid filter system, all designed to handle the particle size and compressibility of a solid and/or filter cake being processed.

The filter device is mounted within the mixer in such a manner so as not to interfere with the efficient mix action of the plow/chopper or equivalent device. The efficiency of the filter is such that only a relatively small filter area is required compared to conventional filtration processes. The internal mounting capability of the filter device allows the consecutive processing steps of mixing, reacting, filtering, washing, and drying to be carried out in a single processing zone instead of the several processing vessels disclosed in the prior art.

A plow/chopper is only one type of device that can be used in reducing oily solid into smaller particle sizes, although the preferred device for breaking the refinery oily solid into smaller particles in the present invention would be a plow/chopper. A plow/chopper device can be of various contours depending on the shape of the zone used. There are other devices, such as rotaries, that are effective for the reduction in size of solid particles. The particle size is important but not critical to the extraction step of the process. Useful particle sizes are less than $\frac{1}{2}''$ outside diameter. Preferred particle sizes are from about $\frac{1}{8}''$ to about $\frac{1}{4}''$ outside diameter.

After loading the cyanide-containing oily solid by batch or pumping into the zone and reducing the particle size, the pH of the oily solid is adjusted with an acid for assisting in the removal of organic and inorganic cyanides. Types of acids include are sulfuric and hydrochloric acids. The pH of the oily solid is adjusted from a typical pH of about 8.5–10 to a near neutral or acidic state so as to prevent the cyanides from complexing with inorganic metals in the solids which are thought to be responsible for the high cyanide content in the solid residues. A suitable pH range is about 6 to about 8.0.

The oily solid waste is filtered after the adjustment of pH, thereby removing uncomplexed cyanide, water and oil, by vacuum filtration or pressurized nitrogen filtration. Indirect steam heating may be engaged to break emulsions. Filter aids such as diatomaceous earth are used if necessary for the purpose of aiding dewatering or deoiling. Removed oil and/or water mixture are sent to a oil/water separator, to an API separator unit or a biotreater.

After filtration, the solid waste is subjected to a thermal drying step to remove additional moisture. The temperature range to remove moisture is about 100° C. to about 110° C. Higher temperature drying in this step could be used to remove at least a portion of volatile organic contaminants. Suitable temperature ranges for this latter modification are from about 100° C. to about 200° C.

The resulting solid is then extracted at least once with an organic solvent to remove hydrocarbon contaminants. The solvents used in this process must meet three requirements: (1) favorable solubility for the hydrocarbon contaminants under atmospheric conditions; (2) suitable boiling point for ready separation from solid in the drying step as well as separation from oil in the solvent regeneration step; and (3) acceptability from health, safety, and environmental standpoint, Preferably, the solvent is a hydrocarbon or chlorohydrocarbon solvent boiling between about 40° C. and about 150° C.

Solvents such as toluene (b.p. 110° C.) or xylene (b.p. 141° C.) are more effective for extracting heavy or multiple-ring hydrocarbon compounds. Hexane (b.p. 69° C.) is quite suitable because of its low boiling point and it is less of an environmental concern. However, extraction by methylene chloride (b.p. 40° C.) is also suitable because, being a more polar solvent, it is likely to be less affected by the moisture content of the solid. Different solvents can be used interchangeably to cover a wide range of contaminants.

Suitable ratios of solvent to dried solid in the extraction phase of the present invention are in the range of from about 1/1 to about 8/1, but the preferred ratio of solvent to oily solid is from about 2/1 to about 4/1 by weight of solvent to oily solid per extraction stage. The number of extraction steps in the present invention is typically between 2 to 6 stages, depending on the oily solid, the solvent used and the extent of decontamination required.

In a preferred embodiment, the solvent and oily solid are agitated under atmospheric pressure and ambient temperature from about 10 minutes to about 1 hour. Preferably, the solvent and oily solid are agitated together for approximately 1 hour to afford a mixture of solvent-washed solid and spent solvent containing extracted organic contaminants. After each extraction, the spent solvent is separated by filtration and agitation from the extracted resulting dried solid and, depending on the contaminant level in the washed solid, the solid is then subjected to one or more subsequent extraction steps prior to the second drying step of the proposed process. Following each solvent extraction step, the spent solvent containing the extracted oil is sent to a solvent evaporator, which is operated above the boiling point of the solvent to separate the solvent from the oil. The sol vent vapor leaving the evaporator will be condensed in a condenser and sent to the decanter and recycled for subsequent extractions.

The second drying step for the extracted resulting dried solid, preferably conducted by indirect steam heating and by agitation, removes the residual volatile organics, residual cyanides and residual moisture and solvent in the extracted resulted dried solid. Preferably the residual solvent following drying is from less than 1% wt. to about practically nil based on total solid. The suitable time for this second drying step of the present invention is from about 10 minutes to approximately 2 hours at a temperature of at least 10° C. above the boiling point of the solvent used in the extraction step for the present invention. If necessary, stabilizing agents such as cement or coal ash can be added to the dried solids to fix metals.

Finally, the treated, dry solid is unloaded from the unit and disposed of, for example, in a class 1 landfill, if BDAT standards are met, or to an onsite backfill, if more stringent hazardous delisting requirements are met. The unit is also equipped with a live steam injection option to control the moisture content (for instance, to prevent dusting) in the solids before unloading if necessary.

DETAILED DESCRIPTION OF THE DRAWING

The process of the present invention will now be described by referring to the FIGURE. The filter/dryer/mixer/extractor zone 10 of the preferred embodiment is equipped with a filter screen 12 for solid-liquid separation, an effective plow/chopper mixing device 14 for mixing the solvent and oily solid and a steam-jacketed main chamber 13 for drying to remove residual cyanide, solvent and hydrocarbons from residual solids.

The oily solid is first loaded into the plow/chopper mixing device 14 of the filter/dryer/mixer/extractor zone 10 to reduce the solid waste into smaller particle sizes. Following addition of acid, the chopped, pH adjusted oily solid is dewatered and deoiled through a filter screen 12. Once the oily solid is deoiled and dewatered, the resulting dried solid is then contacted with solvent for extraction purposes. After the solvent and solid have been mixed by the mixer 14, the spent solvent is then filtered through the filter screen 12 from the extracted resulting dried solid.

A vacuum is initiated and maintained by a vacuum pump 26 to assist in the filtration. Following each solvent extraction step, the spent solvent containing the extracted oil is sent to a solvent evaporator 20, which is operated above the boiling point of the solvent to separate the solvent from the oil. The solvent vapor leaving the evaporator 20 will be condensed in the condenser 22 and sent to the decanter 24 and recycled for subsequent extractions.

Water or solvent vapor generated during the drying step is sent through the vacuum stack 16 and a filter 18, located at the top of the filter/dryer/mixer/extractor zone 10 to remove entrained solids. The solvent is recovered by condensation in a condenser 22 and sent to the decanter 24 for reuse.

The invention will be described by the following Illustrative Embodiment which is provided for illustrative purposes and are not to be construed as limiting the invention.

ILLUSTRATIVE EMBODIMENT

Table 1 shows data which support that BDAT cyanide standards can be met in this invention either by front-end pH adjustment/filtration or by back-end drying. The data presented are actual field test data. In the first case, the refinery solids were dewatered under different pH, while in the second case, the refinery dewatered solids were "dried" under different temperatures.

TABLE 1

| Constituent | Cyanide Removal from Refinery Oily Solid (K-Wastes) | | | |
|---|---|---|---|---|
| | Refinery Wastes | | | |
| 1. Front-end pH adjustment/filtration | | | | |
| Refinery A | | | | |
| API Separator Bottoms | Filtered Solids at | Filtered Solids at | Final Rule | |

TABLE 1-continued

| Cyanide Removal from Refinery Oily Solid (K-Wastes) | | | | |
|---|---|---|---|---|
| Constituent | Refinery Wastes | | | |
| | Raw Solid | pH = 10.5 | pH = 7.5 | BDAT Standard |
| Total cyanides, mg/kg (50% H$_2$O) | 16 | 17 | 0.8 | 1.8 |

2. Back-end drying

| | Refinery A API Separator Bottoms | | Refinery B API Separator Bottoms | | |
|---|---|---|---|---|---|
| | Feed | Solids dried at 343° C. | Feed | Solids Dried at 220° C. | Final Rule BDAT Standard |
| Total cyanides, mg/kg (50% H$_2$O) | 16 | 0.9 | 11 | 2.7 | 1.8 |

What is claimed is:

1. A process for decontamination of cyanide-bearing, hydrocarbon-contaminated oily solids in a single processing zone which comprises:
   a) reducing the particle size of the solids in the zone;
   b) adjusting the pH of the solids to below 8;
   c) dewatering or deoiling the solids in the zone by filtration;
   d) drying the solids in the zone, thereby removing moisture and volatile organics;
   e) extracting the solids in the zone under atmospheric conditions with an organic solvent boiling below about 150° C. at least one time to remove hydrocarbon contaminants from the solids;
   f) separating the solvent containing the extracted hydrocarbon contaminants from the solids by filtration and agitation; and
   g) further drying the solids to remove residual moisture, volatile organics, residual cyanides, and solvent.

2. The process of claim 1, wherein the particle size of the solids is reduced to an outside diameter of less than ½" in step a).

3. The process of claim 1, wherein the pH of the solids is adjusted to from about 6 to about 8 in step b).

4. The process of claim 1, wherein the pH is adjusted by sulfuric or hydrochloric acids.

5. The process of claim 1, wherein the organic solvent is hexane.

6. The process of claim 1, wherein the organic solvent is toluene.

7. The process of claim 1, wherein the organic solvent is xylene.

8. The process of claim 1, wherein the organic solvent is methylene chloride.

9. The process of claim 1, which further comprises adding a stabilizing agent to the dried solids to fix metals.

10. The process of claim 9, wherein the stabilizing agent is cement.

11. The process of claim 9, wherein the stabilizing agent is coal ash.

* * * * *